United States Patent [19]

Kreiner

[11] 4,442,358
[45] Apr. 10, 1984

[54] APPARATUS FOR DETECTING α-RAYS PRESENT IN A SPECIFIED ENERGY RANGE

[75] Inventor: Hans-Jürg Kreiner, Munich, Fed. Rep. of Germany

[73] Assignee: Münchener Apparatebau für elektronische Geräte Kimmel GmbH, Haar, Fed. Rep. of Germany

[21] Appl. No.: 208,321

[22] Filed: Nov. 18, 1980

[30] Foreign Application Priority Data

Nov. 23, 1979 [DE] Fed. Rep. of Germany ....... 2947302

[51] Int. Cl.$^3$ ................................................ G01J 1/16
[52] U.S. Cl. .................................... 250/435; 250/364
[58] Field of Search ............... 250/335, 374, 379, 380, 250/383, 384, 364, 435

[56] References Cited

U.S. PATENT DOCUMENTS

| 2,892,091 | 6/1959 | Sawle | 250/364 |
| 4,132,894 | 1/1979 | Yule | 250/435 |
| 4,185,199 | 1/1980 | Droullard et al. | 250/435 |

FOREIGN PATENT DOCUMENTS 1195603 6/1970 United Kingdom .
1403265 8/1975 United Kingdom .

Primary Examiner—Bruce C. Anderson
Attorney, Agent, or Firm—Wood, Dalton, Phillips, Mason & Rowe

[57] ABSTRACT

A method and apparatus for detecting α-rays present in a specified energy range includes a chamber in which is located a filter, an αdetector and a measuring space which is kept at less than 40% of normal atmospheric pressure. The reduced measuring space pressure in turn reduces energy loss of the α-particles as they travel from the filter to the detector, thereby permitting a high degree of differentiability of the α-particles according to their energy levels while at the same time providing a large enough sample of α-particles for α-activity measurement. Sufficient collimation of the α-rays is effectuated by limiting the linear distance across the detector receiving surface as compared with the distance between the detector and filter receiving surfaces. The collimation is further improved by tapering conically the inside surface of the chamber toward the detector, and by disposing the average aperture angle of the surface elements of the filter between 90° and 95° with respect to the receiving surface of the detector.

21 Claims, 1 Drawing Figure

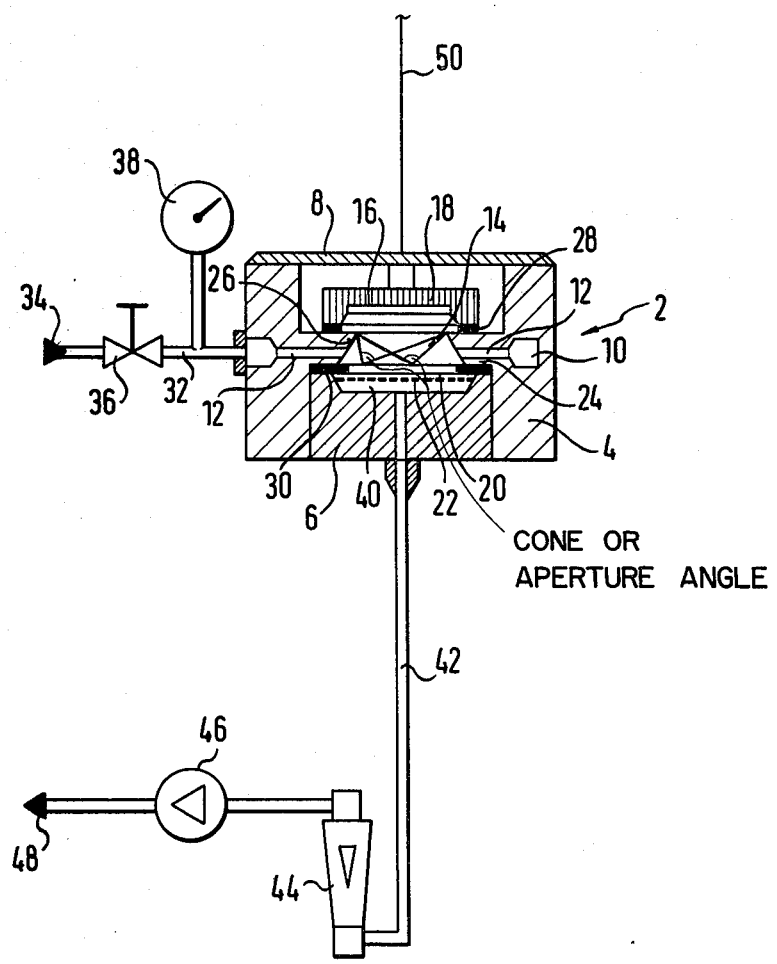

APPARATUS FOR DETECTING α-RAYS PRESENT IN A SPECIFIED ENERGY RANGE

BACKGROUND OF THE INVENTION

This invention relates to an apparatus and method for detecting α-rays present in a specified energy range, which may be emitted from particles dispersed in a gas, and more particularly, particles emitted by an aerosol.

Systems used to detect the energy of α-particles permit the detection of α-rays which are emitted by artificially produced nuclides. The energy level of α-rays emanating from artificially produced nuclides frequently is approximately the same as the energy level of α-rays emitted from naturally occurring α-emitters, such as disintegration products of radon or thoron.

Prior art systems developed to perform this function utilize a chamber having a measuring space therein through which the gas is directed. The measuring space is defined by a first boundary wall consisting of the receiving surface of a filter, and a second boundary wall which is opposite the first boundary wall and which consists of the receiving surface of an α-ray detector. The filter separates the particles from the gas. The α-ray detector is an energy-discriminating α-ray detector which measures and indicates the energy of the separated α-particles.

The prior art systems referred to, however, suffer from a distinct disadvantage. As the α-rays travel from the receiving surface of the filter to the receiving surface of the detector, they lose energy due to the presence of air in the measuring space. The statistical effect of energy loss as the α-particles travel between the receiving surfaces results in the detection of α-particles which have energy levels different from their original energy levels. This effect causes overlapping of the measured energy ranges, reducing significantly the ability of the α-detector to discriminate between originally-differing α-ray energies.

SUMMARY OF THE INVENTION

In accordance with the present invention, a method and apparatus for detecting α-rays present in a specified energy range provides for a high degree of energy discrimination of α-rays, the original energy of which deviates from one another by a relatively slight degree, such as, for example by 300 keV.

The method of performing this function is accomplished by reducing the pressure in the measuring space to less than 40%, and preferably between 25% and 35%, of normal atmospheric pressure.

By decreasing the pressure of the measuring space, the energy loss of the α-particles as they travel from the receiving surface of a filter to the receiving surface of an α-ray detector is reduced, resulting in a decrease of overlapping of the originating energy bands. By maintaining the pressure of the measuring space in the preferably mentioned range, the overlapping of the energy bands is reduced by a significant degree while still providing a sufficiently large sample to obtain a satisfactorily measurable α-particle activity.

An apparatus for executing this method includes a cylindrical body having therein an annular channel coupled to the surrounding atmosphere. A series of ports extend radially outward from the measuring space to the annular channel parallel to the receiving surface of the filter or inclined at an acute angle thereto. To obtain the desired pressure decrease in the measuring space relative to the surrounding atmosphere, an adjustable throttle coupled to the annular channel and a pump are provided.

In order to further decrease energy band overlapping, the linear distance across the receiving surface of the detector is preferably between 3.5 and 4.5 times the distance between the two receiving surfaces. By so limiting the proportion of these distances, a sufficient sample of the α-particles is measured while at the same time the collimation of the α-particles is increased.

The collimation is further improved by tapering the chamber conically in the direction of the receiving surface of the detector. Moreover, the average aperture angle of the surface elements of the filter are disposed between 90° and 95° with respect to the receiving surface of the detector.

BRIEF DESCRIPTION OF THE DRAWING

The sole drawing comprises an elevational view, partly in cross-section, of the apparatus used for detecting α-rays present in a specified energy range.

DESCRIPTION OF THE PREFERRED EMBODIMENT

Referring to the drawing, there is shown a cylindrical chamber, indicated generally at 2, which is defined by a cylindrical peripheral body 4, a bottom wall 6 and a cover 8. Disposed within the peripheral body 4 is an annular channel 10 which surrounds and communicates with a measuring space 14 by means of a series of ports 12 which extend radially outward with respect to the axis of the peripheral body 4.

The measuring space 14 is defined at its lower end by the receiving surface 20 of a membrane filter 22 and at its upper end by the receiving surface 16 of an α-ray detector 18. The radial ports 12 penetrate an annular flange 24 which extends radially inward from the peripheral body 4 and which has an inner circumferential surface 26. Packings 28 and 30, located between the α-ray detector 18, the flange 24 and the filter 22, seal the measuring space 14 airtight against the surroundings with the exception of the ports 12 and the pores in the filter 22. In order to direct the air flow towards the receiving surface 20 of the filter 22, the radial ports 12 extend parallel to the receiving surface 20 and have an obliqued opening, or the ports 12 extend at an acute angle with respect to the receiving surface 20 of the filter 22. Since there is provided a plurality of ports 12, a low and turbulence-free air flow is achieved.

The annular channel 10 is connected with an inlet opening 34 leading to the surrounding atmosphere by way of a feed line 32. To regulate the air flow through the line 32, there is provided an adjustable throttle 36. A pressure gauge 38, connected to the line 32 between the throttle 36 and the annular channel 10, is provided to monitor the pressure within the line 32.

Below the underside of the filter 22, there is a suction chamber 40 which is connected with a flow meter 44 and a pump 46 by way of a line 42. The α-particle laden gas, which is drawn through the opening 34 and the measuring chamber 14 by the pump 46, and from which the α-radiating suspended liquid or solid particles are separated on the filter 22, is removed through an outlet opening 48 into the surrounding atmosphere.

The detector 18 is coupled by an electrical line 50 to an electronic evaluation system (not shown) which measures and indicates the height of the pulses emitted by the detector 18. A silicon barrier layer detector having a layer thickness of 80–120 μm has been shown to be particularly suitable as a detector. The details of the electronic system for the operation of the detector 18, and for the evaluation of the pulses emitted by it are known, and hence, are not discussed here.

In order to minimize energy overlapping, a compromise must be made regarding the ratio of the linear distance across the receiving surface of the detector 18 to the distance between the receiving surface of the detector 18 and the receiving surface 20 of the filter 22. If this ratio is too large, a decreased collimation occurs, meaning that some α-particles must travel too long a distance in the measuring space 14, leading to undesirable overlapping of the energy bands. If the ratio of the first distance to the second is too small, too few α-particles get from the filter 22 to the detector 18. As a practical matter, a favorable compromise results if the linear distance across the receiving surface of the detector 18 at its widest point is between 3.5 and 4.5 times the distance between the two receiving surfaces.

The collimation, and hence the α-ray discriminating ability of the apparatus, is also improved by tapering the inner circumferential surface 26 of the annular flange 24 toward the receiving surface of the detector.

A further improvement in the collimation results if the average cone angle (averaged aperture angle) of aperture cones opening from each surface point from the receiving surface 20 of the filter 22 to the circumference of the receiving surface 16 of the detector 18 is between 90° and 95°.

A membrane filter of nitrocellulose is preferred as the filter 22 because the α-particles are effectively separated on the surface of the filter without being trapped within the pores. In order to detect radioactive impurifications in the air, it has been proved to be especially expedient if the average diameter of the pores of the filter is between 1.0 and 3.0 μm.

I claim:

1. An α-ray detection apparatus including an energy discriminating α-ray detector having a receiving surface for measuring the energy of α-particles suspended in a gas which are separated from the gas on the receiving surface of a membrane filter, comprising:
   a cylindrical body enclosing a chamber within which said detector and said filter are disposed;
   an annular flange extending from said cylindrical body radially inward with respect to the axis of said body, said flange having first and second surfaces perpendicular to said axis and a circumferential inner surface tapered toward said second surface, said filter receiving surface being sealed against said first surface and said detector receiving surface being sealed against said second surface whereby a measuring space is formed defined by said receiving surfaces and said circumferential inner surface;
   pressure reduction means for reducing the pressure of said measuring space to less than atmospheric pressure to reduce energy loss by said α-particles while in said measuring space; and
   admitting means for admitting said gas suspended α-particles into said measuring space through said annular flange.

2. The α-ray detection apparatus of claim 1, wherein the admitting means includes an annular channel which communicates with a source of gas suspended α-particles and which is disposed within said cylindrical body and a series of ports extending radially outward from said measuring space to said channel through said annular flange.

3. The α-ray detection apparatus of claim 2, wherein said ports are angularly disposed with respect to the receiving surface of said filter between a position parallel to said receiving surface and a position forming an acute angle thereto, whereby the air flow is directed toward the receiving surface of said filter, to avoid contamination of the receiving surface of said detector.

4. The α-ray detection apparatus of claim 2, wherein the admitting means further includes an adjustable throttle disposed between the annular channel and said source of gas suspended α-particles.

5. The α-ray detection apparatus of claim 4, wherein the pressure reduction means includes a suction chamber located across said filter from said measuring space, and a pump for creating a suction in said suction chamber for drawing said α-particles into said measuring space through said adjustable throttle, said annular channel and said ports.

6. The α-ray detection apparatus of claim 1, wherein the linear distance across the receiving surface of the detector is between 3.5 times and 4.5 times the distance between the two receiving surfaces.

7. The α-ray detection apparatus of claim 1, wherein said filter includes an averaged cone angle of aperture cones opening from each surface point of the receiving surface of said filter to the circumference of the receiving surface of said detector, which is between 90° and 95°.

8. An α-ray detection apparatus having a cylindrical body enclosing a chamber, said chamber having disposed therein an energy discriminating α-ray detector and a membrane filter, said detector and said filter having receiving surfaces spaced apart and oriented toward each other perpendicular to the axis of said cylindrical body, comprising:
   an annular flange extending from said cylindrical body radially inward with respect to the axis of said body, said annular flange having an inner circumferential surface disposed between said receiving surfaces, said inner circumferential surface and said receiving surfaces defining a measuring space;
   an annular channel disposed within said cylindrical body and communicating with a source of α-particles suspended in a gas;
   a series of ports extending radially outward from said measuring space to said annular channel through said annular flange whereby said ports are disposed between positions parallel to and at an acute angle to the receiving surface of the filter; and
   pressure reduction means for reducing the pressure of said measuring space below normal atmospheric pressure, including suction means for drawing said gas through said annular channel and said ports into said measuring space whereby said α-particles are separated by said filter and the energy thereof is measured by said detector.

9. The α-ray detection apparatus of claim 8, wherein said inner circumferential surface is tapered toward the receiving surface of said detector to increase the collimation of said α-particles as they travel between said receiving surfaces.

10. The α-ray detection apparatus of claim 8, wherein the suction means includes a suction chamber disposed on the other side of said filter across from said measuring space and a pump for maintaining the pressure within said measuring space between 25% and 35% of normal atmospheric pressure.

11. The α-ray detection apparatus of claim 8, wherein the pressure reduction means includes an adjustable throttle disposed between said annular channel and said source of α-particles for controlling the admittance thereof into said measuring space.

12. The α-ray detection apparatus of claim 8, wherein the filter includes an averaged cone angle of aperture cones opening from each surface point of the receiving surface of said filter to the circumference of the receiving surface of said detector, which is between 90° and 95°.

13. The α-ray detection apparatus of claim 8, wherein the linear distance across the receiving surface of said detector is limited to between 3.5 times and 4.5 times the distance between said receiving surfaces.

14. An apparatus for detecting α-rays present in a specified range which are emitted from particles dispersed in a gas by means of a peripheral body having a measuring space therein through which the gas flows, said measuring space having a first boundary wall containing the receiving surface of a filter for separating the particles from the gas, and a second boundary wall which is opposite said first boundary wall and contains the receiving surface of an energy discriminating α-ray detector, characterized by:

said peripheral body being cylindrical in shape and having a circumferential inner surface directed radially inward with respect to the axis of said peripheral body and extending into the space between said receiving surfaces and penetrated by ports which extend between positions parallel to the receiving surface of the filter and positions forming an acute angle relative to the receiving surface of the filter;

wherein said ports begin at an annular channel which surrounds the measuring space, said annular channel being connected with a source of gas suspended α-particles by means of an adjustable throttle to thereby reduce the pressure below normal atmospheric pressure.

15. The apparatus of claim 14, wherein the linear distance across the receiving surface of the detector is between 3.5 times and 4.5 times the distance between the two receiving surfaces.

16. The apparatus of claim 14, wherein said inner circumferential surface is provided on an annular flange and tapers conically in the direction of the receiving surface of the detector.

17. The apparatus of claim 14, wherein the aperture angle of the surface elements of the filter, averaged over the receiving surface of the filter, is between 90° and 95° with respect to the receiving surface of the detector.

18. The apparatus of claim 14, wherein the average diameter of the pores of the filter is between 1.0 and 3.0 μm.

19. The apparatus of claim 14, wherein the detector is a silicon barrier layer detector having a barrier layer thickness on the order of 80 μm to 120 μm.

20. The apparatus of claim 14, wherein the filter includes a membrane of nitrocellulose.

21. An apparatus for detecting α-rays present in a specified energy range which are emitted from particles dispersed in a gas by means of a peripheral body having a measuring space therein through which the gas flows, said measuring space having a first boundary wall containing the receiving surface of a filter for separating the particles from the gas, and a second boundary wall which is opposite said first boundary wall and contains the receiving surface of an energy discriminating α-ray detector, characterized by:

said peripheral body being cylindrical and having an annular flange directed radially inward with respect to the axis of said peripheral body and extending into the space between said first and second boundary walls and penetrated by ports which extend between a first position parallel to the receiving surface of the filter and a second position inclined at an acute angle relative to the receiving surface of the filter, said ports starting out from an annular channel which surrounds said measuring space, said annular channel being connected with a source of gas suspended α-particles by means of an adjustable throttle for maintaining the pressure in the peripheral body at less than 40% of the normal atmospheric pressure;

the receiving surface of said detector having a linear distance thereacross between 3.5 times and 4.5 times the distance between the two receiving surfaces;

said annular flange having an inner circumferential surface which tapers conically in the direction of the receiving surface of the detector; and said filter having surface elements, the aperture angle of which, when averaged over the receiving surface of the filter, is between 90° and 95° with respect to the receiving surface of said detector.

* * * * *